United States Patent
Zhang

(10) Patent No.: US 8,055,138 B2
(45) Date of Patent: Nov. 8, 2011

(54) PHOTOSENSOR OPERATING POINT

(75) Inventor: Wangsheng Zhang, Fremont, CA (US)

(73) Assignee: Applied Optoelectronics, Inc., Sugar Land, TX (US)

( * ) Notice: Subject to any disclaimer, the term of this patent is extended or adjusted under 35 U.S.C. 154(b) by 835 days.

(21) Appl. No.: 12/023,995

(22) Filed: Jan. 31, 2008

(65) Prior Publication Data

US 2009/0196624 A1    Aug. 6, 2009

(51) Int. Cl.
*H04B 10/06* (2006.01)

(52) U.S. Cl. ........ 398/209; 398/202; 398/208; 398/135; 398/136; 398/137; 398/25; 398/26; 398/27; 398/33; 398/38; 398/195; 398/196; 398/197; 385/88; 385/89; 385/90; 385/92; 385/93; 250/214 R; 250/214 A; 250/214 AG; 250/214 LA

(58) Field of Classification Search .................. 398/135, 398/136, 137, 138, 139, 158, 159, 160, 164, 398/79, 141, 202, 208, 209, 213, 214, 81, 398/25, 26, 27, 22, 23, 24, 33, 38, 192, 193, 398/195, 196, 197, 162; 385/88, 89, 90, 385/92, 93; 250/214 A, 214 C, 214 AG, 250/214 LA, 214 R
See application file for complete search history.

(56) References Cited

U.S. PATENT DOCUMENTS

| | | | |
|---|---|---|---|
| 5,225,922 A * | 7/1993 | Chraplyvy et al. | 398/94 |
| 6,222,660 B1 * | 4/2001 | Traa | 398/213 |
| 7,580,638 B2 * | 8/2009 | Aronson et al. | 398/137 |
| 2007/0248357 A1 * | 10/2007 | Fediakine et al. | 398/27 |
| 2008/0215280 A1 * | 9/2008 | Kaku et al. | 702/107 |

OTHER PUBLICATIONS

"An Introduction to Error Location Analysis—Are all your errors truly random?" Application Note 1550-2, Agilent Technologies, www.agilent.com, 2000, 15 pages.
"Optical Communication Products Announces DWDM SFP Product Line MSA compliant modules for OC-48/STM-16 80km applications" OCP, http://www.ocp-inc.com/news-details.asp?ID=1127150864, Sep. 19, 2005, 2 pages.
Product Specification, Rev A, Finisar Corporation, Dec. 15, 2005, 11 pages.
1.0625 Gb/s Fiber Channel, 1.25 Gb/s Gigabit Ethernet, 1550 nm Single mode, 20 km Distance, OptoIC Technology, The Optical I/O Company, 2001-2006, 3 pages.
"Receive Sensitivity: A Practical Explanation" A Technology Brief, Tropos networks, Jul. 2007, 4 pages.

* cited by examiner

*Primary Examiner* — Hanh Phan
(74) *Attorney, Agent, or Firm* — Norman A. Kinsella; Berkeley Law & Technology Group, LLP

(57) ABSTRACT

The subject matter disclosed herein relates to determining a photosensor operating point.

12 Claims, 3 Drawing Sheets

PHOTOSENSOR OPERATING POINT

FIELD

Subject matter disclosed herein relates to determining a photosensor operating point.

BACKGROUND

Modern communication networks, comprising telecommunications and data communications, may incorporate optical signals with electrical signals. For a variety of reasons, one may therefore convert optical signals to electrical signals, or vice versa throughout various stages of a communication network. For example, a termination of a fiber optic trunk line may involve a conversion of its optical signals into electrical signals that subsequently become routed into electrical-based equipment. Afterward, the electrical signals may be converted back to optical signals. Optical transceivers are generally used to convert between electrical and optical signals.

Industry consensus has resulted in optical transceiver modules that meet common electrical, management, and mechanical specifications. Such a module is commonly referred to as a small form-factor pluggable (SFP) module. One newer high-speed variant is commonly referred to as an XFP module.

As data rates grow beyond 10 Gb/sec, positive-intrinsic-negative (PiN) photodiodes used as a photosensor in a receiver portion of transceiver systems are increasingly being replaced by avalanche photodiodes (APD) for improved receiver sensitivity. But using an APD may involve careful finesse of its operating conditions, including drive bias voltage or temperature compensation, for example.

Proposal SFF-8472, Rev 10.3, released Dec. 1, 2007 (available at ftp://ftp.seagate.com/sff), for example, describes an enhanced functions monitoring interface for optical transceivers, which allows real time access to an SFP/XFP module to monitor its operating parameters, such as temperature and component drive currents, just to name a few examples.

Bit error ratio (BER), the result of dividing the number of bit errors by the total number of bits in a stream, may be used to identify the performance of a communications component, such as an optical transceiver, for example. If bit errors exceed desired limits, one may wish to distinguish between the many possible error sources to identify what problems exist and to what degree.

BRIEF DESCRIPTION OF THE FIGURES

Non-limiting and non-exhaustive embodiments will be described with reference to the following figures, wherein like reference numerals refer to like parts throughout the various figures unless otherwise specified.

DETAILED DESCRIPTION

Figure 1:
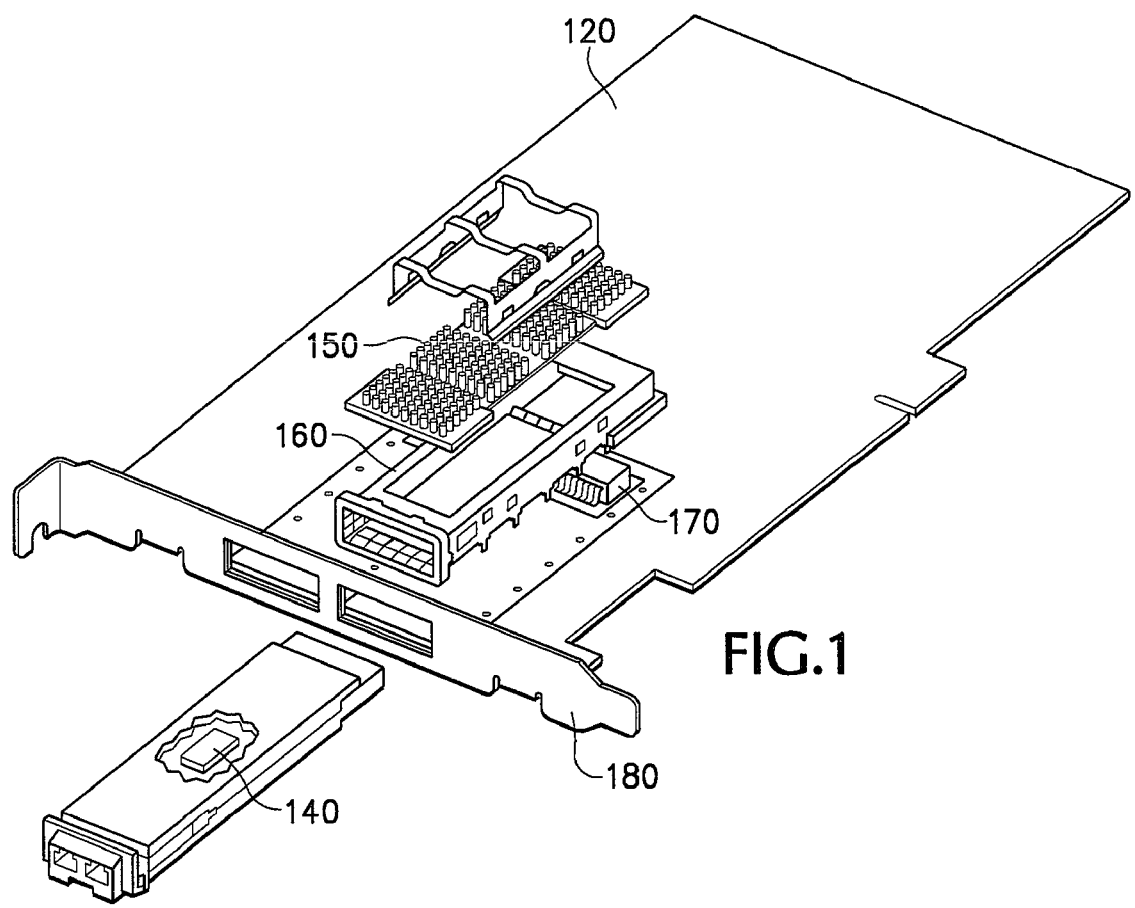
FIG. 1 is a perspective diagram of a transceiver module and a host board, according to an embodiment.

Reference throughout this specification to "one embodiment" or "an embodiment" means that a particular feature, structure, or characteristic described in connection with an embodiment is included in at least one embodiment of claimed subject matter. Thus, appearances of the phrase "in one embodiment" or "an embodiment" in various places throughout this specification are not necessarily all referring to the same embodiment. Furthermore, the particular features, structures, or characteristics may be combined in one or more embodiments.

An avalanche photodiode detector (APD) may be used as a photosensor to receive an optical signal in an optical communications system. In particular, an APD may be included in a small form factor pluggable (SFP) module that may be used in telecom or datacom applications to change an optical signal into an electrical signal or vice versa.

To operate an SFP module, one may search for desired operating conditions for the incorporated APD. Within an SFP module, an APD may produce an output power responsive to light intensity that it receives. APD output power may also depend, at least in part, on electrical conditions with which the APD operates, such as bias voltage level, for example. Furthermore, receiver sensitivity may comprise an SFP module parameter pertaining to an APD included in the SFP module, as discussed in detail below.

Operating an SFP module may involve searching for a bias voltage that achieves a desired sensitivity. Such a search may include a trial-and-error approach, such as stepping through various bias voltage levels, for example, until an APD output power indicates a desired sensitivity. Additionally, to illustrate another example, light intensity received by an APD may be varied for a sequence of bias voltage level adjustments. Needless to say, trial-and-error search may involve a relatively large number of bias voltage and light intensity levels to find a desired combination. Such a search may take a relatively long time.

As mentioned above, industry consensus has resulted in an SFP optical transceiver module that meets electrical, management, and mechanical specifications. Such specifications specify module support of a digital diagnostic monitoring (DDM) interface, which will be discussed in more detail below. Among other parameters, a DDM interface allows one to monitor power received by an APD.

In an embodiment, a method of determining desired APD operating conditions for an SFP module may include using a DDM signal to measure APD output power during a coarse process, followed by a fine process that considers a dependency of bit error ratio (BER) on APD operating conditions. APD operating conditions may include APD bias voltage level, for example. In particular, a coarse process may include applying a known light intensity to be received by an APD, while stepping through various APD bias voltage levels until APD output power is measured by a DDM signal to be within a range of desired sensitivity. A subsequent fine process may use a final value of APD bias voltage level determined in the proceeding coarse process as a starting point. The fine process may include adjusting optical attenuation of a light source to affect light intensity received by an APD. Such an adjustment may continue until reaching a desired BER. Afterward, light intensity received by an APD may be held substantially constant, for example, while stepping through various APD bias voltage levels to find a desirable BER.

As mentioned above, bit error ratio (BER), the result of dividing the number of bit errors by the total number of bits in a stream, may be used to identify the performance of a communications product or system, for example. Bit errors in such a product or system may result from improper design or random events, which may include noise. For example, bit errors may result from thermal noise or possible receiver sampling errors in a system that includes an optical drive, an optical receiver, connectors, optical fiber, and so on. Optical attenuation or dispersion may also be a source of bit errors. For instance, light received from an optical fiber by an optical receiver may convert an optical signal to an electrical signal using a photosensor, such as an APD. An optical receiver may involve optical to electrical conversion in the order of microamperes, e.g., currents small enough to be susceptible to thermal and shot noise, leading to bit errors.

Due to the relatively low frequency of bit errors, it may take a relatively long time to gather enough data to accurately measure BER. Accordingly, estimation and extrapolation techniques may be used to determine BER in a relatively short duration. A bit error ratio tester (BERT) may be used to measure BER. BERT may use a known signal pattern input to a receiver system, and measure the consequent output signal of the system, quantifying how closely the output signal follows the input signal.

FIG. 1 is a perspective diagram of an SFP transceiver module embodiment 140 and a host board 120, according to an embodiment. Either host board 120, SFP transceiver module 140, or both may meet electrical, management, and mechanical specifications set by an industry-wide multi-source agreement (MSA). In particular, host board 120 may comprise a printed circuit board to which a cage assembly 160 and connector 170 for receiving transceiver module 140 is mounted. A heat sink 150 may be thermally coupled to cage assembly 160. A bezel 180 may be coupled to a front edge of host board 120 for securing host board 120 to a rack (not shown), for example. Module embodiment 140 may comprise an SFP module, or an XFP module, for example. Of course, claimed subject matter is not limited in scope to this particular embodiment. This embodiment is described here for purposes of illustration.

Figure 2:
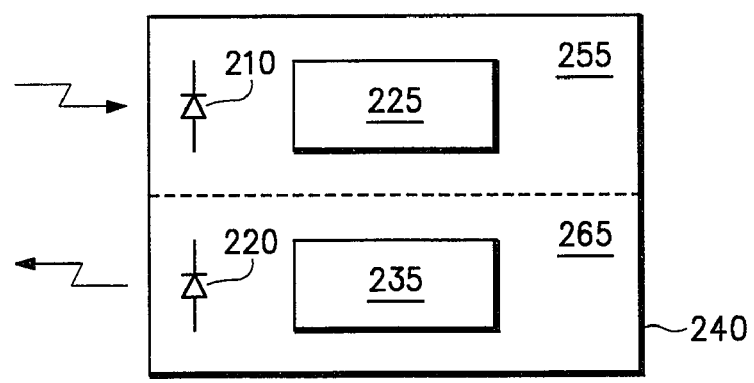
FIG. 2 is a schematic showing a configuration of a transceiver, according to an embodiment.

FIG. 2 is a schematic diagram showing a configuration of a transceiver module 240, according to an embodiment. Transceiver module 240 may include a detector portion 255 and an emitter portion 265. Emitter portion 265 may include a laser diode driver 235 to drive a laser diode 220, though other light sources, such as a light emitting diode (LED) for example, may be used. Detector portion 255 may include a receiver 225 to drive an APD 210, for example. In particular, receiver 225 may include a driver circuit to, among other things, reverse bias APD 210.

As mentioned above, receiver sensitivity may comprise a parameter pertaining to an APD incorporated in an SFP module. For example, a value for sensitivity may be among other parameters listed in a specification for an SFP. Receiver sensitivity may indicate how faint a light signal can be and still successfully be received by an APD. The lower the power level that the receiver is able to successfully process, the better the receiver sensitivity. For example, a value of receiver sensitivity may be −20 dBm, wherein dBm is an abbreviation for power ratio in decibels (dB) of measured power referenced to one milliwatt. Of course, other measurement units for sensitivity are possible, as one skilled in the art is aware.

In an embodiment, an APD may desirably operate with a sensitivity substantially equal to its specified value if an APD bias voltage is adjusted to an appropriate level. Though receiver sensitivity may be specified for a class of APD'S, due to manufacturing particulars, such a value may be unique to an individual APD, so that each APD may involve a process of searching for an appropriate APD bias voltage level. A uniqueness of an APD may also be a result of, at least in part, its specific application and conditions in which it operates, for example.

In an embodiment, an APD may receive light from a source external to an SFP module in which the APD is included. Here, light is defined to include electromagnetic radiation of any wavelength, including wavelengths in UV, visible, or infrared spectra. An external light source may include a laser diode or an LED, just to list a few examples.

Figure 3:
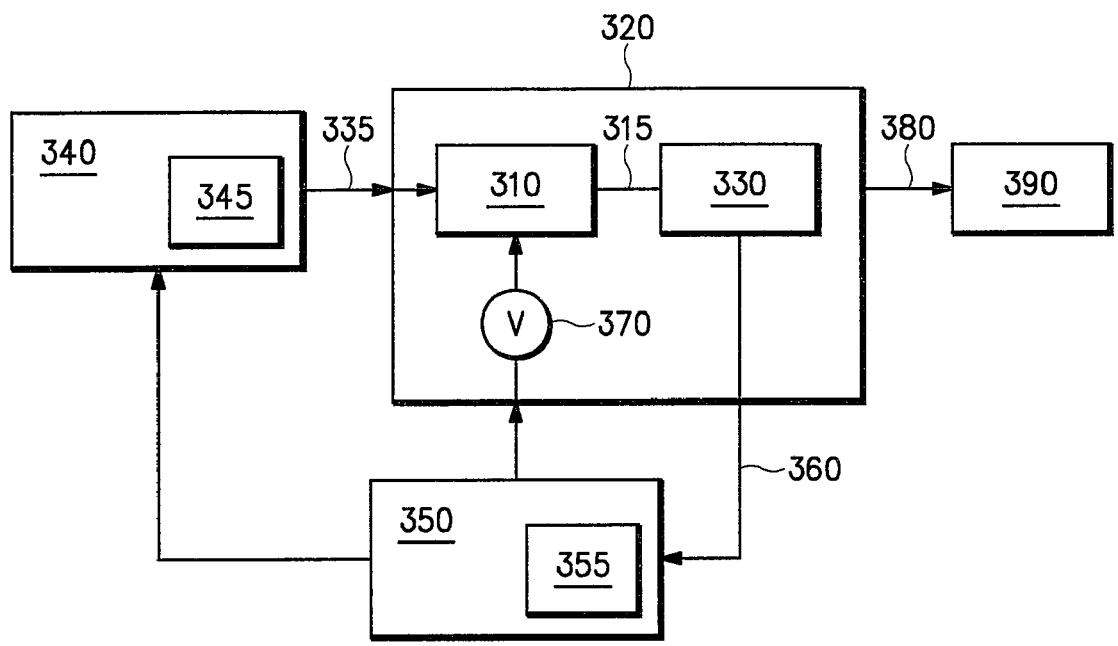
FIG. 3 is a schematic diagram of an apparatus including an APD, light source, and controller, according to an embodiment.

FIG. 3 is a schematic diagram of an apparatus that may be used for adjusting or finding an APD voltage to operate the APD at a sensitivity substantially equal to its specified value, according to an embodiment. An SFP module 320 may include an APD 310 to receive light signal 335 from a light source 340. APD 310 may produce an output power signal 315 responsive, at least in part, to light signal 335. Output power signal 315 may be measured by a DDM signal 330 included in the SFP module 320. In turn, DDM signal 330 may produce a received-power signal 360 monitored by a controller 350. A power source, such as voltage source 370 may be capable of supplying a bias voltage to APD 310. Controller 350 may affect voltage source 370.

In an embodiment, controller 350 may communicate with DDM signal 330 in SFP module 320 via a 2-wire serial bus. Details of such a 2-wire serial bus may be dictated and defined by electrical, management, and mechanical specifications set by the industry-wide MSA, mentioned above. However, again, claimed subject matter is not intended to be limited to this particular example embodiment. Nonetheless, continuing with this example, received-power signal 360 and control for voltage source 370 may be transmitted through a 2-wire serial bus. Differentiation between different types of signals transmitted though the 2-wire bus may be made by recognizing respective addresses of the different signals. A 16-bit integer may be used to convey information regarding a value of a measurement or other signal. For example, an internally measured received-power may be represented as a full 16-bit number having a numeneric range from 0 to 65535 with LSB equal to 0.01 mW and a total measuring range of 0.01 to 0.5 mW. Further details of communication with DDM 330 are below. Of course, this is merely one example, and claimed subject matter is not limited in this respect.

Controller 350 may include a memory 370 to store, among other things, a value for bias voltage applied to APD 310. Such a value may be communicated over the 2-wire serial bus, for example.

Light source 340 may comprise an attenuator 345 to affect intensity of light signal 335. Attenuator 345 may comprise an electrical component, such as a variable power supply, for example, or an optical component, such as a variable filter, for example. Attenuator 345, which is described in more detail below, may also be a combination of electrical or optical components. Light source 340 and its output light signal 335 may be affected by controller 350. In a particular embodiment, controller 350 may affect the light intensity, wavelength, or both. For example, controller 350 may affect attenuator 345, which may comprise a variable power supply, to vary power to a laser diode included in light source 340. Such power variation may affect wavelength or intensity of light signal 335 produced by the laser diode. To describe another example, controller 350 may affect attenuator 345, which may comprise a polarizing filter to affect intensity of light signal 335, or a variable wavelength filter to affect wavelength of light signal 335. In any case, output power signal 315 of APD 310 may be dependent, at least in part, on wavelength or intensity of light 345.

In an embodiment, light source 340 may be modulated to produce a test pattern of logical ones and zeroes so that a bit error ratio (BER) may be measured at an output port of SFP module 320. Attenuator 345 may generate such a modulation, for example. BER may be measured by a bit error ratio tester (BERT) 390 that receives receiver data output signal 380 from SFP module 320, for example.

Accordingly, light signal 335 may involve two types of intensity variations: 1) light signal 335 may be modulated to include logical ones and zeroes. 2) light signal 335 may be varied so that its peak (of its modulated wave-train, if being modulated) changes.

Figure 4A:
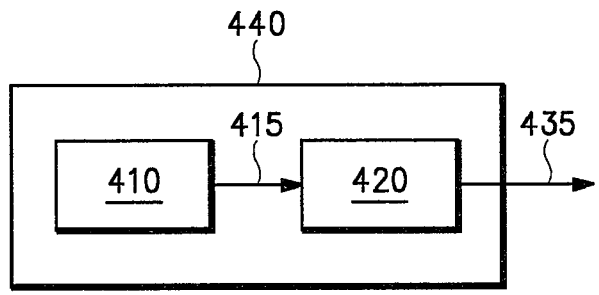
FIGS. 4A and 4B are schematic diagrams of different embodiments of a light source.

FIG. 4A is a schematic showing an embodiment of light source 440, which may include a laser diode 410 and an attenuator 420. In this particular embodiment, attenuator 420 may comprise an optical component, such as a polarizing filter, to act on light 415, thus affecting the intensity of light 435.

Figure 4B:
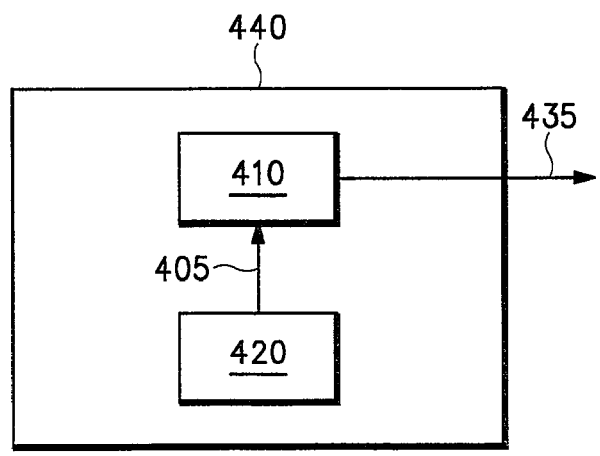

FIG. 4B is a schematic showing light source embodiment 440, which may include a laser diode 410 and an attenuator 420. In this particular embodiment, attenuator 420 may comprise an electrical component, such as a variable power supply, to affect operating power of laser diode 410. For example, attenuator 420 may output electrical signal 405 that may affect the operation of laser diode 410 to vary the intensity of light 435.

In the embodiments of FIGS. 4A and 4B, a laser diode is described. But any number of different types of light sources may be used, including a gas laser or an LED, just to list a few examples. These embodiments also may employ a polarizing filter and a variable power supply, either of which is, again, merely an example. An optical component may include a wavelength filter, a polarizing filter, or an absorbing filter, just to list a few examples. An electrical component may include a voltage supply, a voltage divider, or a resistor, just to list a few examples.

Figure 5:
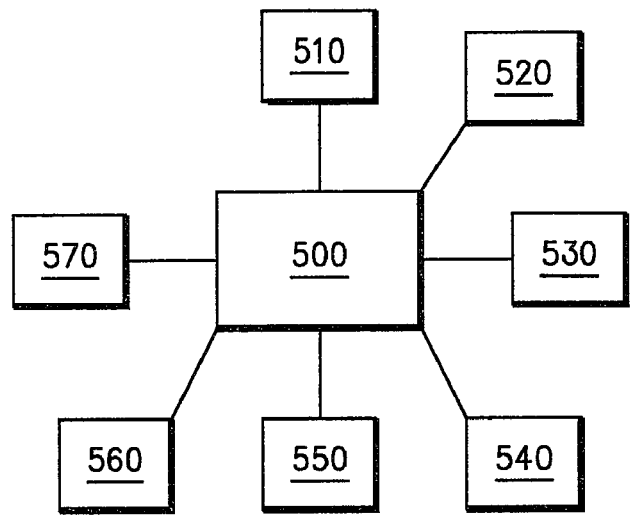
FIG. 5 is a schematic diagram showing functionality of a digital diagnostic monitoring device, according to an embodiment.

FIG. 5 is a schematic showing functionality of a digital diagnostic monitoring (DDM) device, according to an embodiment. DDM device 500 may adhere to specifications set forth by SFP MSA as mentioned above, allowing the monitoring of various SFP module parameters. DDM 500 may gather information of SFP module parameters from transducers incorporated in an SFP module, such as SEP module 320 shown in FIG. 3, for example. Such parameters may include internal temperature 520, DC supply voltage level 530, transmitter bias current 540, transmitter output power 550, received-power signal level 570, laser wavelength 560, or thermoelectric cooler current 510, for example.

In a particular embodiment, received-power signal level 570 may comprise a digital signal resulting from an analog-to-digital converter (ADC) that receives an analog output signal from an APD. Accordingly, optical power may be converted to a digital signal collected by DDM 500.

DDM 500, as discussed above, may communicate to outside the SFP module via a 2-wire serial bus, as described above regarding FIG. 3, for example. A device, such as controller 350 in FIG. 3, may access DDM data at a predetermined address value via the serial bus. Parameters measured by DDM 500 may be communicated over the serial bus in 16-bit data fields, for example. One skilled in the art will understand details involved in communicating with DDM 500.

Figure 6:
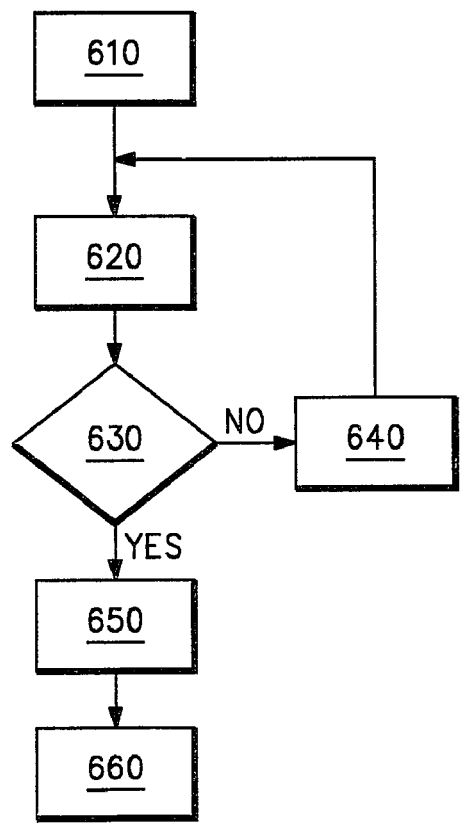
FIG. 6 is a flow chart showing a method for coarse adjustment of a photosensor operating point, according to an embodiment.

FIG. 6 is a flow chart showing a method for coarse adjustment of a photosensor operating point, according to an embodiment. Such a coarse adjustment may involve an apparatus for adjusting an avalanche photodiode (APD) voltage level as shown in the embodiment of FIG. 3, though other apparatuses, devices, or systems may be utilized. In block 610, initial operating parameters for an APD 310 and light source 340 may be selected. APD parameters may include, and are not limited to, bias voltage level or temperature, for example. Light source 340 may include a laser diode, such as laser diode 410 in FIG. 4A. Laser diode parameters may include, and are not limited to, drive voltage level, drive current, temperature, or light output signal, for example. In particular, output light signal 335, which may depend at least in part on other laser diode parameters, may be selected so that received-power 315 is at least approximately near a specified sensitivity for APD 310. For example, one may select light signal 335 to produce an APD output signal of 10 microwatts plus or minus 15%, wherein 10 microwatts is specified as a relatively high sensitivity for the particular APD. Of course, this is only an example, and any number of possible other values of sensitivity or percent range may, of course, be employed.

Once initial values are selected, laser diode parameters may be held to substantially fixed values while a bias voltage level of APD 310 is varied in the following method embodiment. In block 610, an iterative measuring process begins, as indicated in block 620. Here, controller 350 may receive a value of received-power signal 360 measured by DDM 330. Consequently, as indicated in block 630, controller 350 determines if received-power signal 360 is within a desired range of a specified sensitivity for APD 310. If not, then the controller 350 may affect voltage source 370 to adjust the bias voltage level of the APD 310 in order to vary received-power signal 360, as indicated in block 640. The adjustment amount may be performed step-wise or by a series of operations, though any number of different process approaches is possible. Accordingly, received-power signal 360 may consequently fall within the desired range. A determination of this possibility will be executed in block 630. If received-power signal 360 is still not within the desired range, then controller 350 may affect voltage source 370 to again adjust the bias voltage level in order to again vary received-power signal 360, as indicated in block 640. If, however, received-power signal 360 is within the desired range, the current, and final, value for the bias voltage may be stored for subsequent use, as indicated in block 650. In other words, for this embodiment, a final bias voltage $V_f$ may comprise the value of the bias voltage level that finally resulted in received-power signal 360 falling within the desired range. Next, in block 660, a fine adjustment may begin.

Figure 7:
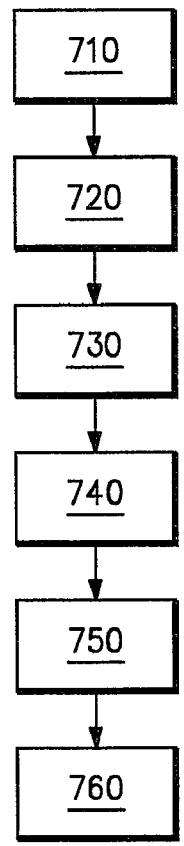
FIG. 7 is a flow chart showing a method for fine adjustment of a photosensor operating point, according to an embodiment.

FIG. 7 is a flow chart showing a method for fine adjustment of a photosensor operating point, according to an embodiment. Such a fine adjustment may involve an apparatus for adjusting an avalanche photodiode (APD) voltage level as shown in the embodiment of FIG. 3, though other apparatuses, devices, or systems may be utilized. A fine adjustment method embodiment may follow a coarse adjustment, as described in FIG. 6.

In block 710 of FIG. 7, $V_f$ may be applied to APD 310 and held substantially constant, while light signal 335 is attenuated to change its intensity. As discussed above, such attenuation or other light adjustment may involve varying any number of light source parameters. For example, light source 340 may include a laser diode, such as laser diode 410 in FIG. 4A. Laser diode parameters may include, and are not limited to, drive voltage level, drive current, temperature, or light output, for example. In particular, output light signal 335, which may depend at least in part on other laser diode parameters, may be varied as in block 720. While varying light signal 335, and substantially simultaneously modulating light signal 335 to include logical ones and zeroes, bit error ratio (BER) may be measured and monitored by BERT 390. Light signal 335 may be varied until BERT measures a BER within a desired range. An example of a BER range may be from $10^{-5}$ to $10^{-10}$, but other ranges may be considered. Thus, this is merely one example, and claimed subject matter is not limited in this respect.

Once light source parameters are found that result in a BER within a desired range, these parameters are held at substantially fixed values, as indicated in block 730, while APD bias voltage level is varied. Then, in a particular embodiment, a process for finding a desired APD bias voltage level may begin by determining an adjustment amount of APD bias voltage, as indicated in block 740. Such a determination may be made by controller 350, but may include instructions loaded into controller 350 from an external source, for example. Such an adjustment amount may be used by controller 350 to vary APD bias voltage level while monitoring BERT 390 for a relatively low BER, as in block 750. APD bias voltage level may be varied within a range of, for example, 20% below $V_f$ to 20% above $V_f$ in 10 steps or operations, in this embodiment. Of course ranges, adjustment amounts, or number of operations other than those illustrated in this embodiment may be used in other embodiments and still remain within the scope of claimed subject matter. Once an APD bias voltage is found for a relatively low BER, that particular APD bias voltage may be considered a desirable value for operating APD 310. Of course, this is merely one example, and claimed subject matter is not limited in this respect.

As described in the embodiments above, methods or apparatuses may be used to adjust an APD bias voltage to a desired value so that bit error ratio is relatively low and a relatively high sensitivity of the APD is utilized. Such an adjustment may take a relatively short time to perform, for at least the reason that a coarse bias voltage adjustment relatively quickly narrows a field of parameter ranges, so that a subsequent fine adjustment may be employed to fine-tune such parameters to find a desired bias voltage level.

One skilled in the art will realize that an unlimited number of variations to the above descriptions is possible, and that the examples and the accompanying figures are merely to illustrate particular implementation(s). While there has been illustrated or described what are presently considered to be example embodiments, it will be understood by those skilled in the art that various other modifications may be made, or equivalents may be substituted, without departing from claimed subject matter. Additionally, many modifications may be made to adapt a particular situation to the teachings of claimed subject matter without departing from concepts or claimed subject matter described herein. Therefore, it is intended that claimed subject matter not be limited to particular embodiments disclosed, but that such claimed subject matter also include all embodiments falling within the scope of the appended claims, or equivalents thereof.

The invention claimed is:

1. A method of adjusting an avalanche photodiode (APD) voltage, the method comprising:
   for a known applied optical power, measuring a DDM-Rx signal of a form pluggable optical transceiver module;
   adjusting said APD voltage based at least in part on said measuring, until said DDM-Rx signal reaches a desired level;
   adjusting said known applied optical power so that a measured bit error rate (BER) is within a target range; and
   adjusting said APD voltage based at least in part on said BER, wherein said adjusting said APD voltage based at least in part on said BER and said adjusting said known applied optical power are performed during different times from one another.

2. The method of claim 1, further comprising:
   after reaching said desired DDM-Rx signal level, adjusting said APD voltage based at least in part on said BER.

3. The method of claim 1, wherein said desired DDM-Rx signal level includes a range of values within a sensitivity of the APD.

4. The method of claim 1, wherein said target range is from 1.0e-5 to 1.0e-10.

5. The method of claim 1, further comprising:
   modulating said applied optical power to include logical ones and zeroes.

6. An apparatus comprising:
   a small form factor pluggable (SFP) module including an avalanche photodiode (APD) and a digital diagnostics monitoring unit (DDM); and
   a controller;
   said controller being capable of adjusting an APD voltage level and an intensity of a light source in response to APD power,
   wherein said controller is capable of adjusting the intensity based at least in part on a measured bit error rate (BER) of said SFP module, and
   wherein said controller is capable of adjusting said APD voltage based at least in part on said BER of said SFP module.

7. The apparatus of claim 6, wherein said APD power comprises a measured APD power received from said DDM.

8. The apparatus of claim 6, further comprising:
   an attenuator to modulate said light source to include logical ones and zeroes; and
   a bit error rate tester to measure said BER of said SFP module.

9. An apparatus comprising: a controller for a hot pluggable module;
   said controller operable to perform adjustment of an avalanche photodiode (APD) voltage and an intensity of a light source based at least in part on a DDM-Rx signal level,
   wherein said controller is capable of adjusting said intensity of said light source based at least in part on a measured bit error rate (BER) of said hot pluggable module, and
   wherein said controller is capable of adjusting said APD voltage based at least in part on said BER of said hot pluggable module.

10. The apparatus of claim 9, wherein said hot pluggable module comprises a small form factor pluggable module (SFP).

11. The apparatus of claim 9, wherein said hot pluggable module comprises an XFP module.

12. An apparatus comprising:

means for measuring a DDM-Rx signal of a form pluggable optical transceiver module for a known applied optical power; and means for adjusting an avalanche photodiode (APD) voltage based at least in part on a measurement of said DDM-Rx signal means for adjusting the known applied optical power based at least in part on a measured bit error rate (BER) of said form pluggable optical transceiver module, and means for adjusting said APD voltage based at least in part on said BER after reaching a desired DDM-Rx signal level.

* * * * *